(12) United States Patent
Youm et al.

(10) Patent No.: US 9,662,584 B2
(45) Date of Patent: May 30, 2017

(54) METHOD AND SYSTEM FOR CONTROLLING GAME AI WHICH COPIES INPUT PATTERN OF GAMER AND PLAYING THE GAME

(75) Inventors: Eui-Joon Youm, Kyunggi-do (KR); Keun Woo Choi, Kyunggi-do (KR)

(73) Assignee: NHN Entertainment Corporation, Seongnam-si (KR)

( * ) Notice: Subject to any disclaimer, the term of this patent is extended or adjusted under 35 U.S.C. 154(b) by 1951 days.

(21) Appl. No.: 11/469,930

(22) Filed: Sep. 5, 2006

(65) Prior Publication Data
US 2007/0054717 A1 Mar. 8, 2007

(30) Foreign Application Priority Data
Sep. 8, 2005 (KR) ........................ 10-2005-0083794

(51) Int. Cl.
| A63F 13/67 | (2014.01) |
| A63F 13/57 | (2014.01) |
| A63F 13/30 | (2014.01) |
| A63F 13/79 | (2014.01) |
| A63F 13/77 | (2014.01) |

(52) U.S. Cl.
CPC .............. *A63F 13/67* (2014.09); *A63F 13/12* (2013.01); *A63F 13/57* (2014.09); *A63F 13/77* (2014.09); *A63F 13/79* (2014.09); *A63F 2300/50* (2013.01); *A63F 2300/6027* (2013.01); *A63F 2300/64* (2013.01); *A63F 2300/8011* (2013.01)

(58) Field of Classification Search
CPC .......... A63F 13/12; A63F 13/67; A63F 13/57; A63F 13/79; A63F 13/77; A63F 2300/50; A63F 2300/6027; A63F 2300/64; A63F 2300/8011

USPC ............................................ 463/29
See application file for complete search history.

(56) References Cited

U.S. PATENT DOCUMENTS

| 6,106,395 | A * | 8/2000 | Begis .............................. 463/23 |
| 6,195,626 | B1 * | 2/2001 | Stone ....................... A63F 13/10 434/14 |
| 6,545,682 | B1 | 4/2003 | Ventrella et al. |
| 7,025,675 | B2 | 4/2006 | Fogel et al. |
| 2002/0090985 | A1 | 7/2002 | Tochner et al. |

(Continued)

FOREIGN PATENT DOCUMENTS

| JP | 08-196744 | 8/1996 |
| JP | 2001-347072 | 12/2001 |

(Continued)

OTHER PUBLICATIONS

Japanese Patent Office, Office Action for Japanese Application No. 2008-145498, Feb. 26, 2013.

*Primary Examiner* — Jasson Yoo
(74) *Attorney, Agent, or Firm* — H.C. Park & Associates, PLC

(57) ABSTRACT

A method and system for controlling a game artificial intelligence (AI), which can provide a lifelike game service as if a gamer plays a game with another real gamer, by enabling a game model which is determined as optimal for a particular game situation from previously played game models or randomly played game models, to play a game AI in an identical game situation. Also, a method and system which can execute the game AI in a pattern where a play trend of the gamer is reflected with respect to a particular game situation.

21 Claims, 4 Drawing Sheets

(56) References Cited

U.S. PATENT DOCUMENTS

| | | | |
|---|---|---|---|
| 2004/0235546 A1 | 11/2004 | Ballard | |
| 2005/0187644 A1* | 8/2005 | Neale et al. | 700/91 |
| 2007/0060359 A1* | 3/2007 | Smith | 463/42 |
| 2010/0113115 A1* | 5/2010 | Hightower | 463/6 |

FOREIGN PATENT DOCUMENTS

| | | | | |
|---|---|---|---|---|
| JP | 2001347072 A | * | 12/2001 | |
| JP | 2002-102534 | | 4/2002 | |
| JP | 2002102534 A | * | 4/2002 | ............ A63F 13/00 |
| JP | 2002-273045 | | 9/2002 | |
| JP | 2002-315968 | | 10/2002 | |
| JP | 2003-205172 | | 7/2003 | |
| KR | 2003-0021762 | | 3/2003 | |
| KR | 2003-0072640 | | 9/2003 | |

* cited by examiner

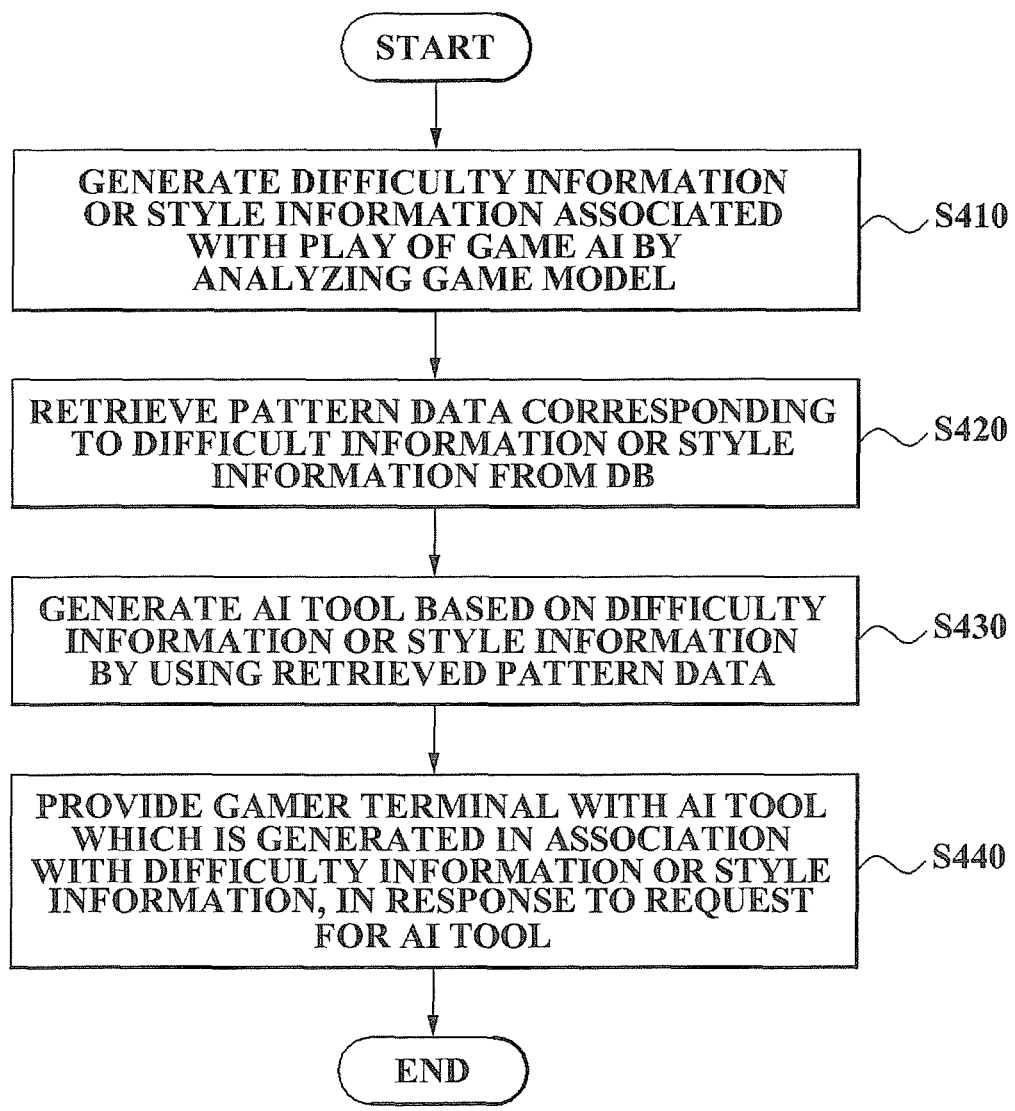

METHOD AND SYSTEM FOR CONTROLLING GAME AI WHICH COPIES INPUT PATTERN OF GAMER AND PLAYING THE GAME

CROSS-REFERENCE TO RELATED APPLICATION

This application claims the benefit of Korean Patent Application No. 10-2005-0083794, filed on Sep. 8, 2005, in the Korean Intellectual Property Office, the disclosure of which is incorporated herein by reference.

BACKGROUND OF THE INVENTION

1. Field of the Invention

The present invention relates to a method and system for controlling a game artificial intelligence (AI), which can provide a lifelike game service as if a gamer plays a game with another real person gamer, by enabling a game model which is determined as optimal for a particular game situation from previously played game models or randomly played game models, to execute a game AI in an identical game situation.

2. Description of Related Art

Due to developments of wired/wireless communication technologies, various types of online games services are being provided. A gamer who receives various types of online games may readily enjoy a multi-user game with another gamer that is located in a remote place, without restriction to a time and a place.

In this case, due to characteristics of an online multi-user game, a game partner who can play an identical game together with the gamer is required. Accordingly, when the gamer does not have a suitable game partner, the gamer may not receive a normal game service. To solve the disadvantage described above, a great number of online game services provide a game service which includes a game artificial intelligence (AI), and makes the game AI play a game as the game partner for the gamer who does not have a suitable partner.

However, the conventional game AI generally plays a game in a pattern which was pre-set by a game designer. The conventional game AI or virtual characters respond in a restricted manner based upon pre-set pattern designed by the game designer. Accordingly, the game AI usually repeats an identical pattern with respect to a similar game situation when playing a game.

Accordingly, the gamer who progresses a game together with the game AI may easily understand the game AI's play pattern and thus, quickly lose interest in the game with the game AI.

Also, in a conventional method of controlling a game AI, when updating pattern information, the game designer may be required to correct the whole control program of the game AI. Also, since additional efforts and costs may be required, the game designer may avoid updating the control program and also may not reflect recent play trends of gamers. Accordingly, the game AI may continuously repeat an identical pattern, which may not attract the gamer's interest.

Accordingly, a model of controlling a game AI which can collect game models according to a play trend of a gamer, and can enable a game model, which is determined as optimal for a particular game situation from the collected game models, to play a game according to the game AI is required.

BRIEF SUMMARY

The present invention provides a method and system for controlling a game AI, which can execute a game AI in a play pattern so that a play trend of a gamer is reflected in a particular game situation.

The present invention also provides a method and system for controlling a game AI, which can determine a play pattern of the game AI by considering a gamer's capability level or play style, and also can provide an improved game service, as if a gamer plays a game against a real gamer, even in a game service where the game AI plays a game as a multi-user partner.

The present invention also provides a method and system for controlling a game AI, which can provide a game service by installing a specialized AI tool, according to a gamer's request, into a gamer terminal, and enabling the installed AI tool to independently provide a game service in the gamer terminal, even when the gamer terminal does not maintain a continuous connection status with an online game server.

The present invention also provides a method and system for controlling a game AI, which can generate an AI tool by extracting a play pattern of a particular group, such as professional gamers, entertainers, teenage girls, and the like, and packaging the extracted play pattern, and also can provide a game service using a mini game AI which copies an excellent player designated by a gamer by downloading the generated AI tool to the gamer terminal.

According to an aspect of the present invention, there is provided a method of controlling a game AI, the method including: acquiring coordinate data of an object in a game space; generating pattern data by using a game model which is played in association with the object; building a database for storing the pattern data in association with the coordinate data; selecting or retrieving one pattern data associated with the coordinate data by referring to the built database, when executing the game AI for the object having the acquired coordinate data; and executing the game AI, based on the retrieved pattern data.

According to another aspect of the present invention, there is provided a system for controlling a game AI, the system including: a location measurement component acquiring coordinate data of an object in a game space; a pattern data generation component generating pattern data by using a game model which is played in association with the object; a database building component building a database for storing the pattern data in association with the coordinate data; a pattern data selection component retrieving one pattern data associated with the coordinate data by referring to the built database, when executing the game AI for the object having the acquired coordinate data; and an AI execution component executing the game AI based on the retrieved pattern data.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 4 is a flowchart illustrating an example of generating an AI tool according to an embodiment of the present invention.

DETAILED DESCRIPTION OF EMBODIMENTS

Figure 1:
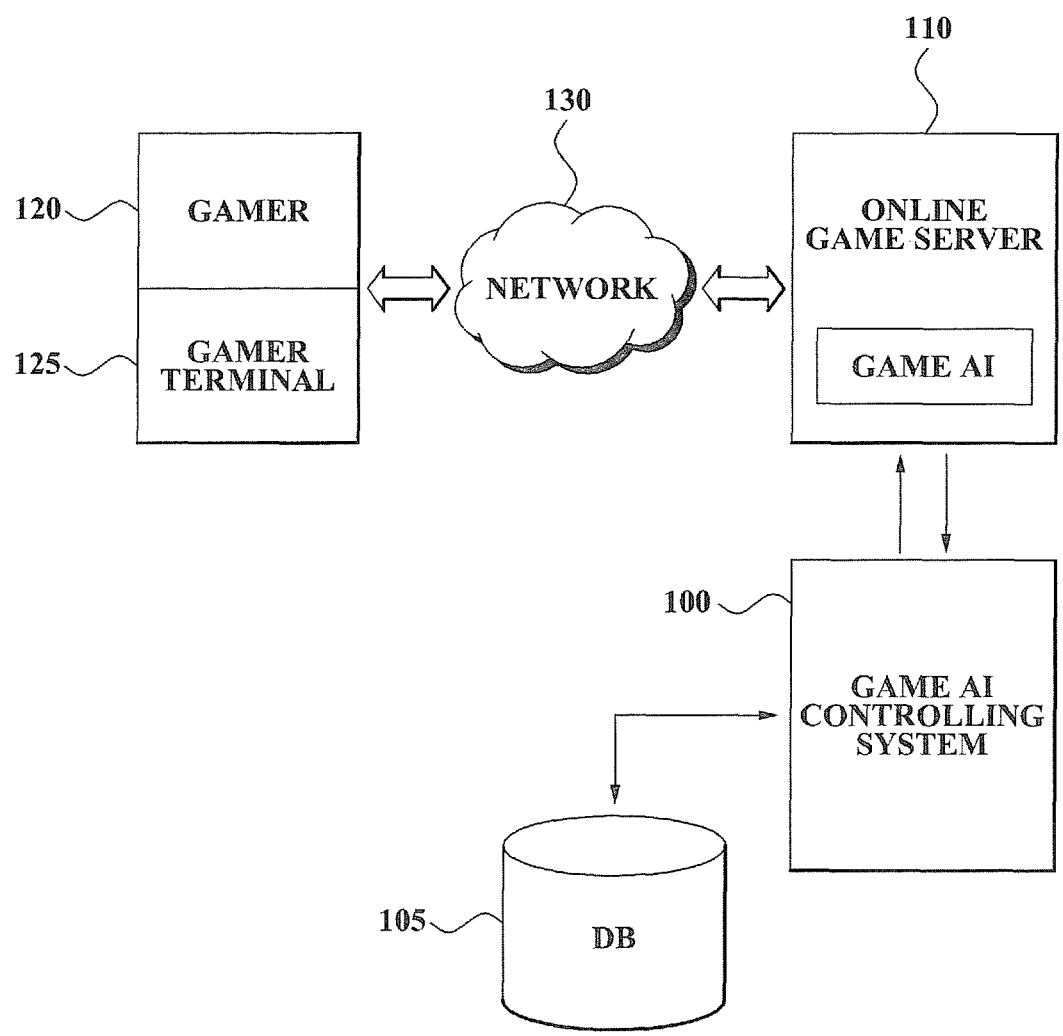
FIG. 1 is a configuration diagram illustrating a system for controlling a game AI according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention may be described herein in terms of functional block components and various processing steps. It should be appreciated that such functional blocks may be realized by any number of hardware components configured to perform the specified functions. In addition, it should be appreciated that the present invention may be practiced in conjunction with any number of video game platforms and program genres and that the system described herein is merely one exemplary application for the invention.

Further, as used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

A "game artificial intelligence (AI)" continuously used throughout the present specification may designate a type of computer-generated game character or player responds to different game situations and conditions which functions as a computer-based multi-user partner for a real person gamer who desires to receive a predetermined game service, and plays a game together with the real person gamer. Specifically, the game AI does not play a game in a pattern which was pre-set by a game designer. The game AI may play a game in an optimal pattern against the real person gamer, from previously played patterns of unspecified gamers or randomly played patterns for a particular game situation.

Accordingly, a method and system for controlling a game AI according to the present invention may aggressively reflect recent play trends of gamers and determine a play pattern of a game AI, and also provide the gamer with an improved game service so that even in a game with the game AI, the gamer enjoys playing a game the same as if with another thinking gamer.

FIG. 1 is a diagram illustrating a system for controlling a game AI according to an embodiment of the present invention.

A game AI controlling system 100 functions to determine a game model for a game AI to play in a particular game situation. Specifically, the game AI controlling system 100 functions to build a database 105 which stores various types of collected game models as game data, and retrieve pattern data for the game AI to play by referring to the built database 105. Namely, the game AI controlling system 100 stores a plurality of pattern data in the database 105, as a solution for a particular game situation, i.e. a particular problem. Also, the game AI controlling system 100 selects pattern data which is determined as optimal for the particular game situation by considering a capability level, trait or a play style of a real person gamer 120 who plays the game with the game AI, by referring to the built database 105. In this case, the game AI that plays according to the retrieved pattern data may execute an appropriate counter-response for the game situation. Accordingly, the gamer 120 may regard the game AI as a worthy component and thus, may not lose interest in the game.

Also, an online game server 110 may designate, for example, a Multiple User Dialogue (MUD) game service server, a Multiple User Graphic (MUG) game service server, and the like, which is connected to a gamer terminal 125 via a network 130 and provides the gamer 120 with the online game service. As used in this application, the term "server", unless it is specifically limited, is intended to refer to a computing device or system configured to perform any number of functions and operations associated with game AI controlling system. Alternatively, a "server" may refer to software that performs the processes, methods, and/or techniques described herein. The game AI controlling system 100 is operatively coupled to the online game server 110.

Specifically, when the gamer 120 desires to receive a game service, but does not have another gamer that can play a game together due to various reasons, the online game server 110 may include the game AI to be a multi-user partner for the gamer 120. Here, the various reasons may include when the gamer 120 cannot find a multi-user partner suitable for the gamer's 120 capability level.

Namely, the online game server 110 may provide the gamer 120 with a game service via the network 130. Also, the online game server 110 may provide the gamer 120 with various types of game services while securing both a game progress between a plurality of gamers 120 and the game progress between the gamer 120 and the game AI.

The gamer 120 may designate an Internet user that controls the gamer terminal 125 to access to the online game server 110 via the network 130, and receives a game service from the online game server 110 under a predetermined contract. Also, the gamer 120 may transmit a predetermined AI tool request to the game AI controlling system 100, and install the AI tool, which is provided in response to the AI tool request, into the gamer terminal 125. Accordingly, even when not maintaining a connection status with the online game server 110, the game service may be provided to the gamer 120 via the AI tool. Also, the gamer 120 may play a game with the game AI which plays according to the gamer's 120 desired level or style.

The gamer terminal 125 maintains a connection status with the online game server 110 via the network 130, such as the Internet, a telephone line, and the like, and displays the online game on a screen. Also, the gamer terminal 125 may be a general concept of a terminal which includes a calculation capability by including a memory and a microprocessor, such as a personal computer (PC), a handheld computer, a personal digital assistant (PDA), a mobile phone, a smart phone, and the like.

The game AI controlling system 100 maintains a solution for a particular game situation, i.e. a particular problem, in the database 105 as pattern data. Also, the game AI controlling system 100 may select optimal pattern data for a particular game situation by considering the gamer's capability level or style, and subsequently control the game AI to play a game against the gamer 120 according to the selected pattern data. Hereinafter, a configuration of a game AI controlling system 200 will be described with reference to FIG. 2.

Figure 2:
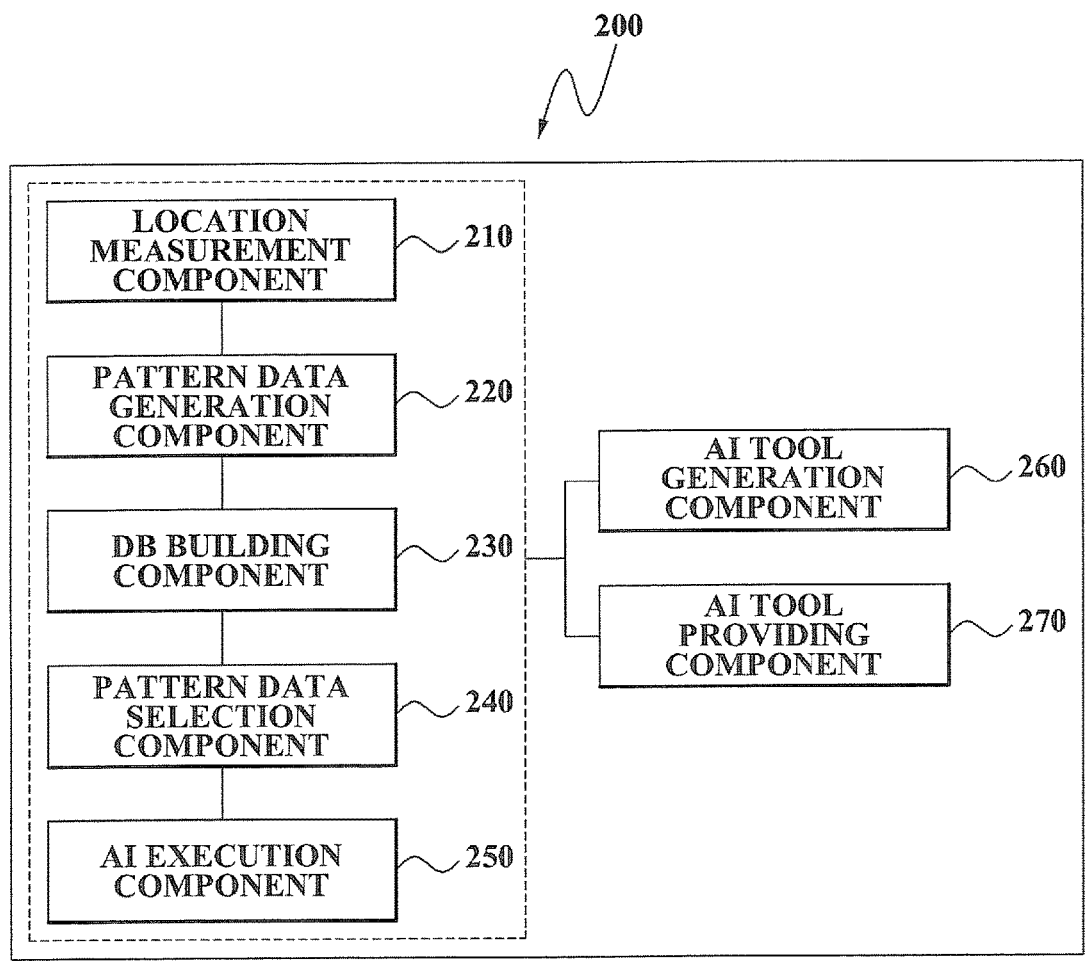
FIG. 2 is a block diagram illustrating a system for controlling a game AI according to an embodiment of the present invention.

FIG. 2 is a block diagram illustrating a game AI controlling system according to an embodiment of the present invention. It is contemplated that FIG. 2 also illustrates a schematic view of a game AI controlling system according to an embodiment of the present invention.

The game AI controlling system 200 includes a location measurement component 210, a pattern data generation component 220, a database building component 230, a pattern data selection component 240, and an AI execution component 250. The game AI controlling system 200 and constituent elements thereof may be recorded in computer-readable media including program instructions to implement various operations embodied by a computer or be in the form of one or more hardware devices that may be specially configured to perform its functions, which may include a microprocessor, read-only memory (ROM), random access memory (RAM), flash memory, and the like.

The location measurement component 210 functions to acquire coordinate data of an object in a game space, and generate a location of an individual object in a form of information which can be recognized in the game AI controlling system 200. Here, the object designates a target object which is substantially played in a game. As an example, when the game service is a billiard game, a billiard ball may be designated as the object. Also, when the game service is a golf game, a golf ball or a hole (cup) may be designated as the object.

When generating the coordinate data, the location measurement component 210 may generate coordinate data of a particular object by equally dividing a game space, for example, a width of a standardized billiard table in the billiard game, into two-dimensions, x and y, and indicating a point where the object is located using the coordinates x and y.

The pattern data generation component 220 generates pattern data by using a game model which is played in association with the object. Namely, the pattern data generation component 220 functions to collect game models, which were played by unspecified gamers, for each of game situations, and generate each of the game models into pattern data. Specifically, the pattern data generation component 220 generates the game models, which can solve the particular game situation, into the pattern data. Also, the pattern data generation component 220 may generate the pattern data which can induce the game AI to play similar to the play trend of the real gamer 120 by selecting the game model to be generated into the pattern data from the previously played game models.

Here, the particular game situation may designate a configuration of how the object is located. The pattern data generation component 220 continuously collects the game models which were previously played by the unspecified gamers with respect to an identical game situation.

Also, as another method of generating pattern data, the pattern data generation component 220 may make the game AI randomly play a game model with respect to one game situation, and generate the game model into the pattern data. Here, the game model is determined as a success. Hereinafter, the above-described method is referred to as a "trial and error" method. Specifically, the pattern data generation component 220 may execute the game AI by applying various types of game models with respect to the identical game situation, and may generate the game model, which is determined as the success or a failure similar to the success, as the pattern data, from the previously played game models.

In the case of the trial and error method, a server end including the game AI, i.e. the online game server 110, may execute the game AI to randomly play a game model. In this case, great amounts of calculations are required which may cause excessive loads on the server end. Accordingly, the pattern data generation component 220 may alleviate loads on the server end by identifying the gamer terminal 125, which waits for a turn, from the gamer terminals 125 receiving the game service associated with the game AI, and enabling the identified gamer terminal 125 to execute a portion or the whole of the randomly played game models by the game AI.

Specifically, the pattern data generation component 220 may identify the gamer terminal 125 which waits for a turn while the game is in progress, and enables the identified gamer terminal 125 to randomly play the game models instead of the game AI while the gamer terminal 125 is waiting. Also, the pattern data generation component 125 may acquire a play result from the gamer terminal 125.

When generating the pattern data, the pattern data generation component 220 calculates information about a size (F) of a force, an angle (θ) of the force, and a point (s, t) where the force is substantially added by analyzing the game model, and generates the pattern data including the calculated information.

Here, the size (F) of the force may be associated with amounts of the force which is added to the object, the angle (θ) of the force associated with a slope where the force is added, for example, a slope based on a virtual horizontal line, and the point (s, t) associated with the point in the object where the force is substantially added.

As an example, when a multi-user game service is a billiard game, the pattern data generation component 220 may calculate the size (F) of the force of a cue which cues the 'billiard ball' object, the slope (θ) of the cue which cues the 'billiard ball' object, and the point (s, t) which is an external point of the 'billiard ball' object. Also, the pattern data generation component 220 may include the generated information in the pattern data. Specifically, when calculating the point (s, t), the pattern data generation component 220 may equally divide an external surface of the 'billiard ball' object into horizontal s and vertical t, and indicate a particular point of the external surface of the 'billiard ball' object into the point (s, t).

Accordingly, the pattern data generated by the pattern data generation component 220 includes the size (F) of the force, the angle (θ) of the force, and the point (s, t), and enables the game model using the information included in the pattern data to be played by the game AI.

The database building component 230 functions to build the database 105 for storing the pattern data in association with the coordinate data. Specifically, the database building component 230 associates a game model, which can be played by the game AI in a single game situation, with a plurality of pattern data, and stores the pattern data associated with the game model in the database 105.

A pair of 'coordinate data—pattern data', which the database building component 130 stores in the database 105, may be selected by considering success information of the achieved task or failure information which is included in the pattern data. When the game AI plays a game based on the pattern data, only the pattern data that is optimal for an associated game situation may be selected. Specifically, the database building component 230 may select only the pattern data including success information or the pattern data including failure information within the set error, from the pattern data including the failure information, and store the selected pattern data in the database 105.

When selecting the pattern data including the failure information, the database building component 230 performs a predetermined pattern correction with respect to the failure information with the set error. Accordingly, even the pattern data including the failure information may be processed in the same way as the pattern data including the success information via the pattern correction, and thereby, stored in the database 105.

Here, when the game AI plays a game using the size (F) of the force, the angle (θ) of the force, and the point (s, t) which are included in corresponding pattern data, the pattern data including the success information may designate pattern data which can accurately strike another billiard ball by moving the 'billiard ball' object directly towards a target path in the above-described billiard game. Also, when the game AI plays a game using the size (F) of the force, the angle (θ) of the force, and the point (s, t) which are included in corresponding pattern data, the pattern data, which includes the failure information, but is selected to be stored in the database 105, may designate pattern data which does not move the 'billiard ball' object directly towards the target path, but incurs a comparatively small error between the target path and a moved path.

The pattern data selection component 240 selects one pattern data associated with the coordinate data by referring to the built database 105, when executing the game AI of the object having particular coordinate data. Specifically, the pattern data selection component 240 functions to determine a game model for the game AI to play in a particular game situation, and select one pattern data which is determined to be optimally capable of solving the particular game situation from a plurality of pattern data. Here, the plurality of pattern data corresponds to one coordinate data.

In this case, the pattern data selection component 240 may determine the pattern data by considering the gamer's 120 capability level, play style, and the like. The database 105 may store difficulty information or style information in correspondence to each of the pattern data.

As an example, the pattern data generation component 220 may generate style information or difficulty information associated with a play of the game AI by analyzing the game model when generating the pattern data. Also, the database building component 230 may additionally store the generated difficulty information or the style information in the database 105 in association with the pattern data of the game model.

Specifically, the database 105 maintains the style information (e.g., an attack style, a defense style, etc.), or the difficulty information in correspondence to each of the pattern data by using the pattern data. Here, the difficulty information is about a difficulty level of the game AI, for example, a low level, an intermediate level, and a high level.

Also, when generating the difficulty information or the style information, the pattern data generation component 220 may consider at least one of a movement reason of the object, a movement path of the object, a movement distance of the object, a number of changes of a movement direction, and a number of collisions between objects. As an example, when the 'billiard ball' object moves within about 5 m (movement distance) on a billiard table by three cushions (movement path, number of changes of movement direction, number of collisions) by a masse (movement reason) with respect to a particular game model associated with a billiard game, the pattern data generation component 220 may make the difficulty information, 'high level', correspond to the pattern data generated in association with the game model.

Accordingly, the pattern data selection component 240 may check the capability level or the play style of the gamer 120 who plays against the game AI, and identify the difficulty information or the style information corresponding to the gamer's 120 checked capability level or play style, from the database 105. Also, the pattern data selection component 240 may select one pattern data from the pattern data corresponding to the identified difficulty information or the style information.

The AI execution component 250 executes the game AI based on the selected pattern data. Specifically, the AI execution component 250 enables the game AI to play an optimal game model for a particular game situation by using the pattern data which is identified from the database 105 in correspondence to the coordinate data and the difficulty information or the style information.

When executing the game AI, the AI execution component 250 applies predetermined error probability information to the pattern data, so as to not secure unconditional success even when the game AI plays based on the pattern data. A size of the error probability information may be determined by considering the capability level of the gamer 120 who plays a game against the game AI. As an example, when the gamer's 120 capability level is low, the AI execution component 250 may increase the size of the error probability information so that the play of the game AI may have a great number of failures.

As described above, the game AI controlling system 200 may prevent all the game models of the game AI from being successful, so that the gamer 120 may keep interested in a game without being bored.

According to another embodiment of the present invention, a system for controlling a game AI which can play a game model with respect to a particular game situation independently in a gamer terminal (without maintaining an online status) will be described. In this case, the game AI controlling system 200 may further include an AI tool generation component 260 and an AI tool providing component 270.

When a request for an AI tool including difficulty information or style information is received from the gamer terminal 125, the AI tool generation component 260 retrieves pattern data corresponding to the difficulty information or the style information from the database 105, and generates the AI tool by using the retrieved pattern data. Specifically, the AI tool generation component 260 retrieves the pattern data corresponding to the difficulty information or the style information which is generated in association with the play of the game AI, from the database 105, and generates the AI tool by using the retrieved pattern data. Here, the AI tool may designate a type of a game control program which can execute a mini game AI included in the gamer terminal 125. The AI tool generation component 260 may generate a specialized AI tool by considering the features, such as the difficulty information and the style information, of the pattern data which is utilized for generating the AI tool.

As an example, when generating the AI tool for a game service for an unskilled gamer 120, the AI tool generation component 260 may retrieve the pattern data corresponding to the difficulty information, 'low level', from the database 105, and may generate the AI tool, 'low-grade player', for the low-leveled gamers 120 by using the retrieved pattern data.

The AI tool generation component 270 provides the gamer terminal 125 with the generated AI tool, in response to the request for the AI tool. Specifically, in response to the request for the AI tool from the gamer terminal 125, the AI tool generation component 270 provides the gamer terminal 125 with the AI tool which is generated in association with the difficulty information or the style information. As an example, when the request for the AI tool including the difficulty information, 'low level', is received from the gamer terminal 125, the AI tool providing component 270 may provide the generated AI tool 'low-grade player' to the gamer terminal 125 which transmitted the request for the AI tool. The AI tool is installed in the gamer terminal 125, and controls the mini game AI included in the gamer terminal 125 to play a game. Also, the mini game AI may select one pattern data, which is determined as optimal for a particular game situation for the mini game AI to play, from the pattern data which are included in the installed AI tool. Since the mini game AI plays a game based on the selected pattern data, an optimal game model for the particular game situation may be played by the mini game AI. Also, the AI tool generation component 270 charges the gamer 120 with a predetermined fee for providing the AI tool to the gamer terminal 125. Accordingly, an operator of the present system may make some financial benefits. When charging the gamer 120, a general payment model may be utilized, and thus, description related thereto will be omitted. Also, the gamer terminal 125, which received the AI tool and internally installed the received AI tool, may generate an upgrade request at a predetermined time interval. The game AI controlling system 200 enables the provided AI tool to be continuously upgraded by receiving the generated upgrade request and transmitting an updated AI tool to the gamer terminal 125. In this case, the AI tool generation component 260 may further include, for example, a second database which stores the generated AI tool. The second database may store the generated AI tool by the AI tool generation component 260 with a name associated with the difficulty information or the style information.

Specifically, the game AI controlling system 200 stores the generated or the provided AI tool, reflects the pattern data which is generated according to the recent input trend of the gamer 120, continuously updates the generated AI tool, and provides the updated portion to the gamer terminal 125 when the upgrade request is received from the gamer terminal 125. As described above, the game AI controlling system 200 secures continuous upgrading even with respect to the AI tool which is provided to the gamer terminal 125. Accordingly, the game AI controlling system 200 may provide the gamer 120 with a game service, as if the gamer 120 plays a game with another human gamer, via the mini game AI. Here, the mini game AI reflects the gamer's 120 play trend corresponding to a particular period.

Also, when generating the AI tool, the AI tool generation component 260 may identify at least one pattern data from the database 105 by considering a game level of the mini game AI and the difficulty information of the pattern data, and generate the AI tool by using the identified pattern data. Specifically, the AI tool generation component 260 may classify and retrieve pattern data by dividing the game level of the mini game AI into, for example, a high-grade level, an intermediate-grade level, and a low-grade level. Also, the AI tool generation component 260 may generate the AI tool where the difficulty degree is specialized for each of the retrieved pattern data. As an example, the AI tool generation component 260 may generate the AI tool 'high-grade level' for advanced gamers 120 by limitedly retrieving only the pattern data where the difficulty information is greater than 'Lv 100', and using the retrieved pattern data. Also, the AI tool generation component 260 may generate the AI tool 'strategic player' for defensive style gamers 120 by limitedly retrieving only the pattern data including the style information about 'teenage girls' based on an occupation, an age, a sex, and the like, and using the retrieved pattern data.

According to the present invention, it is possible to generate an AI tool by extracting a play pattern of the particular group, such as professional gamers, entertainers, teenage girls, and the like, and packaging the extracted play pattern, and to provide a gamer with a multi-user game service for a particular group by downloading the generated AI tool to a gamer terminal.

As an example, the gamer may receive the game service via the mini game AI which plays a game in a similar pattern as an actual professional baduk player, Lee changho, by downloading the AI tool associated with Lee changho.

Accordingly, when generating the AI tool and activating the generated AI tool in the gamer terminal 125 according to the present invention, the gamer 120 may receive a game service in an identical environment even when the gamer terminal 125 does not maintain a connection status with the online game server 110. Also, according to the present invention, an optimal game model for a particular game situation may play a game via the mini game AI. Accordingly, it is possible to provide an improved game service as if a gamer plays a game with another person.

Hereinafter, operations of the game AI controlling system 200 according to an embodiment of the present invention will be described in detail.

Figure 3:
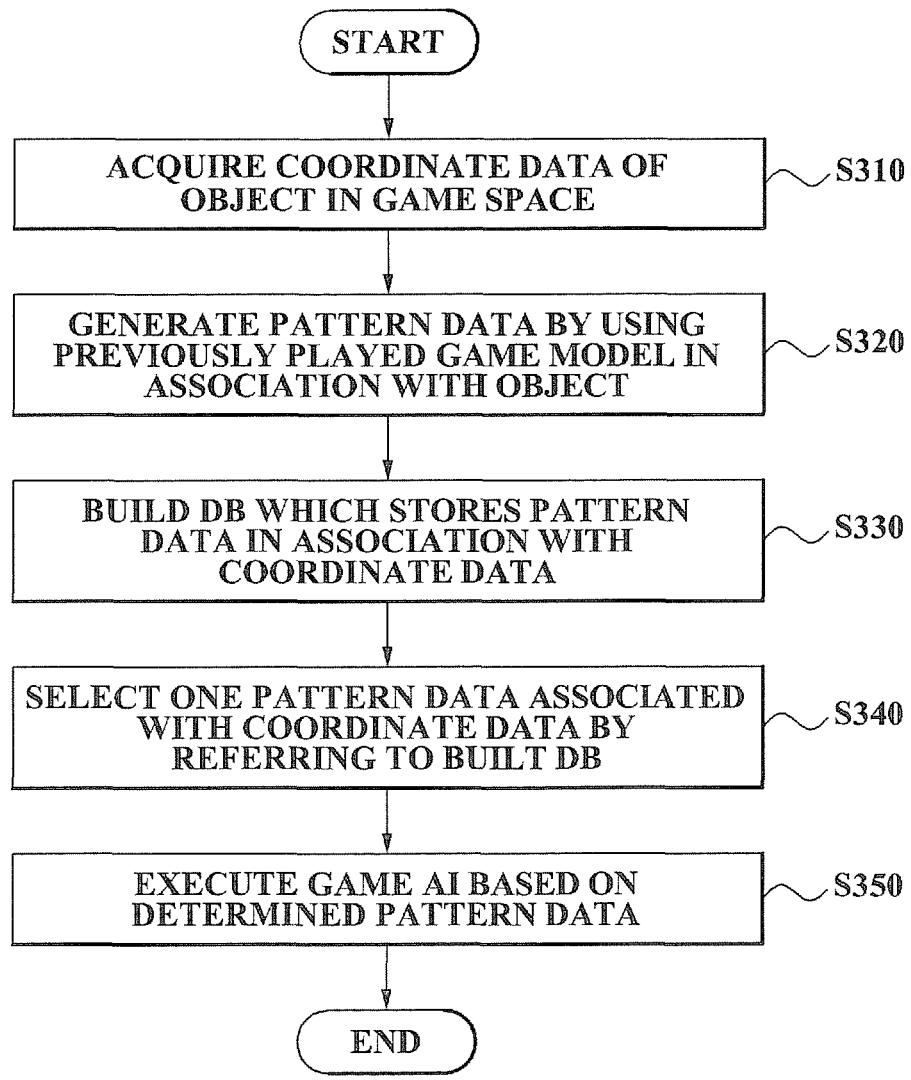
FIG. 3 is a flowchart illustrating a method of controlling a game AI according to an embodiment of the present invention.

FIG. 3 is a flowchart illustrating a method of controlling a game AI according to an embodiment of the present invention.

The method of controlling the game AI may be performed by the game AI controlling system 200 as described above.

In operation S310, the game AI controlling system 200 acquires coordinate data of an object in a game space. Operation S310 is a process of identifying a location of each object which are scattered in the game space when the game is in progress. Here, the coordinate data of the object may be indicated using (x, y).

As an example, when the game space is a billiard table for playing a billiard game, the game AI controlling system 200 may equally divide the entire width of the billiard table into x and y, and indicate a first billiard ball, a second billiard ball, and a third billiard ball which are scattered objects on the billiard table, into (x1, y1), (x2, y2), and (x3, y3) respectively.

In operation S320, the game AI controlling system 200 generates pattern data by using a game model which is played in association with the object. The present operation is a process of generating the previously played game models by unspecified garners with respect to a particular game situation, into pattern data. In this instance, a play result of the game model associated with each of the generated pattern data corresponds to any one between success information and failure information. Here, the pattern data includes at least one answer information about the size (F) of the force which is acquired from the associated game model, the angle (θ) of the force, and the point (s, t) of the object where the force is substantially added.

As an example, in the billiard game where three billiard balls are scattered in the coordinate data (x1, y1), (x2, y2), and (x3, y3) on the billiard table, when a game model, which cues a central point (0, 0) of the first billiard ball of the coordinate data (x1, y1) with a force of a size (F) '5' and an angle (θ) '15°', accurately hits two other billiard balls, the game AI controlling system 200 may make success information correspond to the pattern data which is generated by using the game model.

Also, when a game model, which cues a right lower point (0, 10) of the first billiard ball of the coordinate data (x1, y1) with the size (F) '1' and the angle (θ) '30°', does not hit any one of the remaining two billiard balls, the game AI controlling system 200 may make failure information correspond to the pattern data which is generated by using the game model.

Also, in operation S320, the game AI controlling system 200 enables game models associated with the object to be randomly played by the game AI, and may generate the pattern data by using the trial and error method which determines a success or an failure with respect to each of the played game models. When generating the pattern data by using the trial and error method, the game AI controlling system 200 may alleviate excessive loads in the server end by enabling a portion or all of the randomly played game models to the gamer terminal 125.

In this case, the game AI controlling system 200 selects the pattern data which is determined as the success, or the pattern data which is determined as the failure, but included within a set error range, from the pattern data which is generated by using the trial and error method. Here, when the pattern data is within the set error range, the pattern data may be determined as the success via a pattern correction.

In operation S330, the game AI controlling system 200 builds the database 105 which stores the pattern data in association with the coordinate data. Operation S330 is a process of storing the pattern data in the database 105 in correspondence to each of the game situations. Here, the pattern data corresponds to a solution. Also, the game AI controlling system 200 may allow only the pattern data including success information or only the pattern data including failure information with the set error from the pattern data including the failure information to be stored in the database 105. The pattern data which includes the failure information from the selected pattern data may be changed to include the success information via a predetermined pattern correction.

In the above example, the game AI controlling system 200 may store pattern data 1 which includes the success information (size '4', angle '15°', and point (0, 0) and pattern data 2 which includes the failure information (size '1', angle '30°', and point (0, 10)) in the database 105, in correspondence to the coordinate data (x1, y1), (x2, y2), and (x3, y3). In this case, the game AI controlling system 200 may change the point (0, 10) into point (0, 5) with respect to the pattern data2 including the failure information, and store the changed pattern data2 in the database 105.

In operation S340, the game AI controlling system 200 selects one pattern data associated with the coordinate data by referring to the built database 105, when executing the game AI of the object having particular coordinate data. Operation S340 is a process of randomly selecting one pattern data from a plurality of pattern data corresponding to the game situation. Specifically, in operation S340, the game AI controlling system 200 checks a capability level or a play style of the gamer 120 that plays a game against the game AI, identifies the difficulty information or the style information corresponding to the capability level or the play style of the gamer 120, from the database 105, and selects one pattern data from the pattern data corresponding to the identified difficulty information or the style information.

As described above, the game AI according to the present invention may flexibly control the game AI's game play capability level or game play style according to the gamer 120 who plays a game against the game AI.

In the above-described example, when the capability level of the gamer 120 who plays the billiard game against the game AI is a 'low-grade player', and the game AI is executed in a game situation associated with the coordinate data (x1, y1), (x2, y2), and (x3, y3), the game AI controlling system 200 may determine the pattern data 2 which is generated for the 'low-grade player'.

In operation S350, the game AI controlling system 200 executes the game AI, based on the selected pattern data. Particularly, in operation S350, the game AI controlling system 200 prevents all the plays of the game AI from being successful by applying error probability information to success information, and thereby enables the gamer 120 to keep interested in the game.

In the above-described example, the game AI controlling system 200 executes the game AI based on the selected pattern data 2 with respect to the game situation associated with the coordinate data (x1, y1), (x2, y2), and (x3, y3), and also may control the game AI to cue the first billiard ball of the coordinate data (x1, y1) with a force of a size '1' and an angle '30°'.

As described above, according to the present invention, it is possible to provide a lifelike game service as if a gamer plays a game with another real gamer, by enabling a game AI to play a game model, which is determined as optimal for a particular game situation, from previously played game models or randomly played game models.

An AI tool for controlling a mini game AI so that a game model may be played independently in a gamer terminal according to another embodiment of the present invention will be described.

FIG. 4 is a flowchart illustrating an example of generating an AI tool according to an embodiment of the present invention.

In operation S410, the game AI controlling system 200 generates style information or difficulty information associated with a play of the game AI by analyzing the game model. Operation S410 is a process of predicting a difficulty degree or a play style in a game when the game AI plays a corresponding game model, and generating difficulty information or style information. When generating the difficulty information or the style information, the game AI controlling system 200 may consider at least one of a movement reason of the object, a movement path of the object, a movement distance of the object, a number of changes of a movement direction, and a number of collisions between objects.

In operation S420, the game AI controlling system 200 retrieves the pattern data corresponding to the generated difficulty information or the style information from the database 105. Operation S420 is a process of extracting the pattern data associated with identical difficulty information or the pattern data associated with identical style information from the database 105. As an example, the game AI controlling system 200 may retrieve all the pattern data associated with the game model which is determined as the difficulty information 'high level', from the database 105.

In operation S430, the game AI controlling system 200 generates an AI tool based on the difficulty information or the style information by using the retrieved pattern data. Operation S430 is a process of generating the AI tool by using the retrieved pattern data which is classified for each property, for example, an identical difficulty degree and an identical style. Here, a name which is determined as suitable for the property may correspond to the generated AI tool. As an example, the AI tool 'high-grade player' may correspond to high level gamers, and the AI tool 'strategic player' may correspond to defensive style gamers.

In operation S440, when a request for the AI tool including the difficulty information or the style information is received from the gamer terminal 125, the game AI controlling system 200 provides the gamer terminal 125 with the AI tool which is generated in association with the difficulty information or the style information, in response to the request for the AI tool. Operation S440 is a process of providing a corresponding AI tool to the gamer terminal 125 in response to a transmission request from the gamer 120. The game AI controlling system 200 may charge the gamer 120 with a predetermined fee for providing the AI tool to the gamer terminal 125.

The AI tool, which is transmitted to the gamer terminal 125, is installed in the gamer terminal 125, and may control the mini game AI included in the gamer terminal 125 to play a game. Here, the mini game AI may provide a game service to the gamer 120 even when the gamer terminal 125 does not maintain a connection status with the Internet. Also, the mini game AI may play as similarly as the game AI according to a control of the installed AI tool with respect to a particular game situation in the game service. Specifically, the mini game AI may select one pattern data associated with the coordinate data of an object to play from the pattern data included in the AI tool, and play based on the selected pattern data.

According to the present invention, it is possible to enable the gamer 120 to selectively receive or download the AI tool which includes the gamer's 120 desired property, and also to provide a game service to the gamer 120 without restriction to a time and a place, without a continuous access to the online game server 110.

The game AI controlling method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there is provided a method and system for controlling a game AI, which can execute a game AI in a play pattern so that a play trend of a gamer is reflected in a particular game situation.

Also, according to the present invention, there is provided a method and system for controlling a game AI, which can determine a play pattern of the game AI by considering a gamer's capability level or play style, and also can provide an improved game service, as if a gamer plays a game against a real gamer, even in a game service where the game AI plays a game as a multi-user partner.

Also, according to the present invention, there is provided a method and system for controlling a game AI, which can provide a game service by installing a specialized AI tool, according to a gamer's request, into a gamer terminal, and enabling the installed AI tool to independently provide a game service in the gamer terminal, even when the gamer terminal does not maintain a continuous connection status with an online game server.

Also, according to the present invention, there is provided a method and system for controlling a game AI, which can generate an AI tool by extracting a play pattern of a particular group, such as professional gamers, entertainers, teenage girls, and the like, and packaging the extracted play pattern, and also can provide a game service using a mini game AI which copies an excellent player designated by a gamer by downloading the generated AI tool to the gamer terminal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method using a processor for providing a game artificial intelligence (AI), the method comprising:
  detecting coordinate data to determine a position of an object in a game space;
  generating pattern data by analyzing information of a plurality of game models played by one or more gamers in association with success information and failure information, comprising:
    calculating a size (F) and an angle ($\ominus$) of a force which are applied to the object, and a location of the object where the force is applied by analyzing the game models,
  wherein the generated pattern data comprises one of the calculated size (F) of the force, the angle ($\ominus$) of the force, the location, or any combination thereof, the generated pattern data corresponds to the detected coordinate data, and the generated pattern data associated with the detected coordinate data is stored in a database;

determining, by the processor, a level of a gamer and retrieving pattern data optimized to the level of the gamer, the retrieved pattern data comprising data between the success information and the failure information; and selectively providing the game AI to a user terminal according to the determination, wherein each game model of the plurality of game models comprises a game move corresponding to the coordinate data, the game AI selecting the game move based on the retrieved pattern data, and wherein an error probability information is applied to the success information of the retrieved pattern data, the size of the applied error probability information corresponding to the level of the gamer.

2. The method of claim 1, further comprising:
selecting pattern data comprising the success information;
selecting pattern data comprising the failure information comprising a set of error; and
storing the selected pattern data in the database in association with the detected coordinate data.

3. The method of claim 2, wherein selecting pattern data comprising the failure information further comprises:
providing a pattern correction with respect to the failure information associated with the set of error.

4. The method of claim 1, further comprising:
selecting one of the game models associated with the object of the game;
determining success information or failure information with respect to each of the game models;
selecting one of the game models according to the determination associated with the success information or the failure information within a set of error; and
generating pattern data by using the selected game model.

5. The method of claim 4, further comprising:
identifying a gamer terminal upon receiving a game service request associated with the game AI; and
providing the game AI based on the identified gamer terminal.

6. The method of claim 1, further comprising:
generating style information or difficulty information associated with the game AI by analyzing the game models; and
storing the generated difficulty information or the style information in the database in association with the generated pattern data.

7. The method of claim 6, wherein generating style information or difficulty information comprises considering one of a cause of a movement of the object, a movement path of the object, a movement distance of the object, a number of changes of a movement direction, a number of collisions between objects, or any combination thereof.

8. The method of claim 1, wherein determining a level of a gamer and retrieving pattern data further comprises:
checking a skill level or a play style of the gamer against the game AI;
identifying difficulty information or style information corresponding to the skill level associated with the play style of the gamer; and
retrieving optimized pattern data corresponding to the identified difficulty information or the style information.

9. A method using a processor for controlling a game artificial intelligence (AI), the method comprising:
generating pattern data by analyzing a skill and a trend of a gamer responding to game situations associated with playing a game, comprising:

calculating a size (F) and an angle ($\ominus$) of a force which are applied to an object in a game space, and a location of the object where the force is applied by analyzing the game situations,
wherein the generated pattern data comprises one of the calculated size (F) of the force, the angle ($\ominus$) of the force, the location or any combination thereof;
determining, by the processor, difficulty information or style information of the generated pattern data by analyzing the difficulty information or the style information performed by one or more gamers in association with various game situations, the pattern data comprising a success information and a failure information, wherein the pattern data is stored in a database;
retrieving the pattern data according to the determination of the difficulty information or the style information;
generating an AI tool by using the retrieved pattern data; and
providing the generated AI tool to a user terminal in response to receipt of a request for the AI tool,
wherein each game situation comprises a game move corresponding to coordinate data of the object, the AI tool selecting the game move based on the retrieved pattern data, and
wherein an error probability information is applied to the success information of the retrieved pattern data, the size of the applied error probability information corresponding to the difficulty information or the style information.

10. The method of claim 9, wherein generating the AI tool further comprises:
classifying the pattern data in the database, based on the difficulty information or the style information,
generating the AI tool by using the classified pattern data, and
storing the generated AI tool in a second database in association with the difficulty information or the style information.

11. The method of claim 10, wherein providing the generated AI tool further comprises:
retrieving the AI tool associated with the difficulty information or the style information from the second database, and providing the retrieved AI tool to the gamer terminal.

12. The method of claim 9, wherein the AI tool is installed in the gamer terminal, and controls a game AI, which is included in the gamer terminal associated with playing a game, and
the game AI selects one pattern data from the AI tool, the selected pattern data corresponding to game situations where the game AI plays the game according to the selected pattern data.

13. The method of claim 12, wherein generating the AI tool comprises identifying at least one pattern data from the database by considering a game skill level of the game AI and the difficulty information of the pattern data, and generating the AI tool by using the identified pattern data, and the game skill level of the game AI is divided into a high-grade player, an intermediate-grade player, and a low-grade player.

14. The method of claim 12, wherein generating the AI tool comprises identifying at least one pattern data from the database by considering a game style of the game AI and the style information of the pattern data, and generating the AI tool by using the identified pattern data, and wherein the game style of the game AI is categorized into any one between an attack style and a defense style.

15. The method of claim 9, further comprising:
receiving a request of a different version of the AI tool from the user terminal, the request is generated at a time interval; and
providing the upgraded AI tool to the gamer terminal in response to the request.

16. The method of claim 9, further comprising:
charging the user terminal with a fee for providing the AI tool to the user terminal.

17. The method of claim 9, wherein the difficulty information or the style information is generated by considering one of a cause of a movement of an object associated with the game situations, a movement path of the object, a movement distance of the object, a number of changes of a movement direction, a number of collisions between objects, or any combination thereof.

18. A non-transitory computer-readable record medium comprising an executable program, which when executed by the processor, performs the steps of:
detecting coordinate data to determine a position of an object in a game space;
generating pattern data by analyzing information of a plurality of game models played by one or more gamers in association with success information and failure information, comprising:
calculating a size (F) and an angle ($\Theta$) of a force which are applied to the object, and a location of the object where the force is applied by analyzing the game models,
wherein the generated pattern data comprises one of the calculated size (F) of the force, the angle ($\Theta$) of the force, the location or any combination thereof, the generated pattern data corresponds to the detected coordinate data, and the generated pattern data associated with the detected coordinate data is stored in a database;
determining, by the processor, a level of a gamer and retrieving pattern data optimized to the level of the gamer, the retrieved pattern data comprising data between the success information and the failure information; and
selectively providing the game AI to a user terminal according to the determination,
wherein each game model of the plurality of game models comprises a game move corresponding to the coordinate data, the game AI selecting the game move based on the retrieved pattern data, and
wherein an error probability information is applied to the success information of the retrieved pattern data, the size of the applied error probability information corresponding to the level of the gamer.

19. A system for controlling a game artificial intelligence (AI), the system comprising:
a location measurement component to measure coordinate data of an object to determine a position of the object in a game space;
a pattern data generation component to generate pattern data by analyzing information of a plurality of game models played by one or more gamers in association with the object, comprising:
calculating a size (F) of a force and an angle ($\Theta$) of the force which are applied to the object, and a point of the object where the force is applied by analyzing the game model,
wherein the generated pattern data comprises one of the calculated size (F) of the force, the angle ($\Theta$) of the force, the point, or any combination thereof, and success information and failure information, the pattern data corresponds to the measured coordinate data, and is stored in a database in association with the measured coordinate data;
a pattern data selection component to select pattern data associated with a determination of a level of gamer, the selected pattern data comprising the measured coordinate data and the selection of the pattern data is performed between the success information and the failure information; and
an AI execution component to execute the game AI based on the selected pattern data,
wherein each game model of the plurality of game models comprises a game move corresponding to the coordinate data, the game AI selecting the game move based on the selected pattern data, and
wherein an error probability information is applied to the success information of the retrieved pattern data, the size of the applied error probability information corresponding to the level of the gamer.

20. The system of claim 19, wherein the pattern data comprises any one between the success information and the failure information associated with playing results of the game models by the gamers, and
selection of the pattern data comprises the success information or the failure information comprising a set of error, and stores the selected pattern data in the database in association with the measured coordinate data.

21. A system for controlling a game AI, the system comprising:
a database configured to store pattern data based on a difficulty of game and a style of a gamer, the pattern data performed by one or more gamers;
a processor configured to determine pattern data of an AI tool according to information corresponding to a style of a user and a difficulty of a user game in association with playing against the game AI in response to receipt of a request for the AI tool transmitted from a gamer terminal, wherein the generation of pattern data comprises data between the success information and the failure information selected from game models performed by the one or more gamers,
wherein each game model comprises a game move corresponding to coordinate data of an object in a game space, the game AI selecting the game move based on the determined pattern data,
wherein an error probability information is applied to the success information of the retrieved pattern data, the size of the applied error probability information corresponding to the level of the gamer, and
wherein the pattern data is generated by calculating a size (F) of a force and an angle ($\Theta$) of the force which are applied to the object, and a point of the object where the force is applied by analyzing the game, and the generated pattern data comprises one of the calculated size (F) of the force, the angle ($\Theta$) of the force, the point, or any combination thereof.

* * * * *